US008468422B2

(12) United States Patent
Chessin et al.

(10) Patent No.: US 8,468,422 B2
(45) Date of Patent: Jun. 18, 2013

(54) PREDICTION AND PREVENTION OF UNCORRECTABLE MEMORY ERRORS

(75) Inventors: Stephen A. Chessin, Mountain View, CA (US); Louis Tsien, Watertown, MA (US)

(73) Assignee: Oracle America, Inc., Redwood City, CA (US)

( * ) Notice: Subject to any disclaimer, the term of this patent is extended or adjusted under 35 U.S.C. 154(b) by 1215 days.

(21) Appl. No.: 11/963,559

(22) Filed: Dec. 21, 2007

(65) Prior Publication Data

US 2009/0164872 A1    Jun. 25, 2009

(51) Int. Cl.
*G11C 29/00* (2006.01)
*G11C 29/04* (2006.01)

(52) U.S. Cl.
USPC ............ 714/765; 714/763; 714/767; 714/773

(58) Field of Classification Search
USPC ................. 714/763, 764, 765, 766, 767, 768
See application file for complete search history.

(56) References Cited

U.S. PATENT DOCUMENTS

| | | | |
|---|---|---|---|
| 4,371,930 A | 2/1983 | Kim | |
| 6,560,725 B1 | 5/2003 | Longwell et al. | |
| 6,574,746 B1 * | 6/2003 | Wong et al. | 714/6.2 |
| 7,058,782 B2 | 6/2006 | Henderson et al. | |
| 7,290,185 B2 * | 10/2007 | Kirscht | 714/704 |
| 7,478,307 B1 * | 1/2009 | Wong et al. | 714/763 |
| 2003/0074598 A1 * | 4/2003 | Bossen et al. | 714/6 |
| 2004/0123213 A1 * | 6/2004 | Welbon et al. | 714/752 |
| 2007/0006048 A1 * | 1/2007 | Zimmer et al. | 714/42 |
| 2007/0277083 A1 * | 11/2007 | Van Acht et al. | 714/807 |
| 2008/0201620 A1 * | 8/2008 | Gollub | 714/718 |
| 2008/0307273 A1 * | 12/2008 | Nguyen et al. | 714/704 |
| 2009/0049365 A1 * | 2/2009 | Kim et al. | 714/767 |
| 2010/0058109 A1 * | 3/2010 | Chang et al. | 714/8 |

FOREIGN PATENT DOCUMENTS

EP        0806726        11/1997

OTHER PUBLICATIONS

IBM, Method of Predicting a Bad DIMM otu of a Failing DIMM Set upon an Uncorrectable ECC Error, Feb. 27, 2007, IP.com PriorArt Database, IP.com No. IPCOM000146916D.*
Locklear, David, "Chipkill Correct Memory Architecture", Dell Enterprise Systems Group, Technology Brief, 4 pages, Aug. 2000.
Slayman, Charles, "Impact of Error Correction Code and Dynamic Memory Reconfiguration on High-Reliability/Low-Cost Server Memory", IIRW Final Report, Sun Microsystems, Inc., 4 pages, 2006.
International Search Report, PCT/US2008/083138, 17 pages, Feb. 17, 2009.

* cited by examiner

*Primary Examiner* — Albert Decady
*Assistant Examiner* — Justin R Knapp
(74) *Attorney, Agent, or Firm* — Polsinelli PC (57) ABSTRACT

A method for predicting and preventing uncorrectable errors that may occur while accessing memory in a computer system. The method involves detecting two or more correctable errors from two or more different physical addresses on each of two or more different bit positions from the same DIMM within a specified period of time, with all of the correctable errors occurring within the same checkword. The method also involves detecting two or more correctable errors from two or more different physical addresses on each of three or more different outputs from the same DRAM within a specified period of time, as long as the three outputs do not all correspond to the same relative bit position in their respective checkwords. This allows a computer system which encounters correctable errors to continue to reliably operate without the unnecessary replacement of functioning memory systems.

17 Claims, 5 Drawing Sheets

PREDICTION AND PREVENTION OF UNCORRECTABLE MEMORY ERRORS

FIELD OF THE INVENTION

Aspects of the present invention relate to computer system management. More particularly, aspects of the present invention involve a method for predicting and preventing uncorrectable errors in the memory of a computer system.

BACKGROUND

Computer systems are subject to a variety of problems that may cause errors in memory, ranging from flaws in memory circuitry to background radiation. In response to these known errors, computer memories are often designed such that a small number of isolated errors will not interfere with normal operation. These isolated errors, known as correctable errors, are first detected and then corrected by the computer system to prevent corruption of user data. Computer systems detect errors through the use of common detection techniques, such as using parity bits or through repetition schemes. Once an error is detected, most computer systems can correct the error using error-correcting codes or similar techniques. Those skilled in the art will appreciate the varied techniques that may be employed by computer systems to detect and correct errors in memory.

Generally, computer systems can account for a few isolated errors. However, if the number of correctable errors increases or the errors are not isolated, at some point an occurrence of two or more correctable errors may become uncorrectable. Uncorrectable errors occurring in computer memories often create significant problems. For example, the occurrence of an uncorrectable error may require a stoppage and a restart of the processing system in order to avoid corruption of the user data being processed. Further, memory systems that supply uncorrectable errors can no longer be relied upon to provide accurate data and, therefore, must be replaced or functionally isolated to prevent future occurrences of the uncorrectable errors.

Current approaches to predicting and preventing uncorrectable errors are costly and inefficient. One method currently employed to prevent uncorrectable errors is to provide redundant memory hardware that creates a backup of all stored memory. However, redundant hardware is costly, due both to the incremental cost of the hardware itself and to the additional management cost needed to manage the hardware. Another method currently used is to simply replace a memory system that provides correctable errors under the belief that the existence of correctable errors is an unequivocal warning that the memory system will provide an uncorrectable error sometime in the near future. However, this method is inefficient as not every correctable error is proof of a structural problem within the computer memory system. For example, the correctable error may have been caused by background radiation. Thus, a functioning memory system may be replaced or quarantined unnecessarily. The unnecessary replacement of computer memories has several drawbacks, including financial harm, both through the cost of the memory and the cost of labor for the replacement, system downtime while memory is replaced, and the negative impact on customer relations that results from having to replace memory systems.

What is needed is a way to accurately predict when an uncorrectable error will occur in the future so that proper steps can be taken to prevent the error without incurring the unnecessary financial costs of replacing a functioning computer memory.

BRIEF SUMMARY OF THE INVENTION

The present invention provides objective criteria under which certain patterns of correctable errors predict the subsequent occurrence of an uncorrectable error. Generally speaking, the invention looks for specific patterns of correctable errors, expressed in terms of the relative addresses and bit positions of the errors detected, which indicate an increased likelihood of an uncorrectable error occurring in the near future.

One aspect of the present invention involves a method for predicting uncorrectable errors in memory. The method involves detecting two or more correctable errors from one bit position while accessing separate addresses in memory and two or more correctable errors from a second bit position while accessing separate addresses in memory. The method then determines that the detected correctable errors occurred in the same checkword. If this objective criteria is met, then the affected memory device is identified as having a higher probability of an uncorrectable error.

Another aspect of the present invention also involves a method for predicting uncorrectable errors in memory. This method involves detecting two or more correctable errors from each of three or more separate outputs of a memory device while accessing unique addresses. The method then determines that the outputs do not correspond to the same relative bit position in their respective checkwords. If this objective criteria is met, then the affected memory device is identified as having a higher probability of an uncorrectable error.

Another aspect of the present invention is a system for predicting uncorrectable errors in memory. The system comprises a memory device, a memory controller that performs error detection on the data stored in the memory device and a processor. The processor is configured to detect two or more correctable errors from one bit position while accessing separate addresses in the memory device and two or more correctable errors from a second bit position while accessing separate addresses in the memory device. The processor then determines that the detected correctable errors occurred in the same checkword. If this objective criteria is met, then the affected memory device is identified as having a higher probability of an uncorrectable error.

DETAILED DESCRIPTION OF THE INVENTION

Aspects of the present invention involve a method for predicting and preventing uncorrectable errors that may occur while accessing memory in a computer system. Generally speaking, aspects of the present invention look for specific patterns of correctable errors, expressed in terms of the relative addresses and bit positions of the errors detected from memory within a specified period of time, which indicate an increased likelihood of an uncorrectable error occurring in the future. This allows a computer system which encounters correctable errors to continue to reliably operate without the unnecessary replacement of adequately functioning memory systems. In one particular embodiment, the method predicts the occurrence of an uncorrectable error within a dual in-line memory module (hereafter "DIMM"). In another embodiment, the method predicts the occurrence of an uncorrectable error within a dynamic random access memory (hereafter "DRAM").

Figure 1:
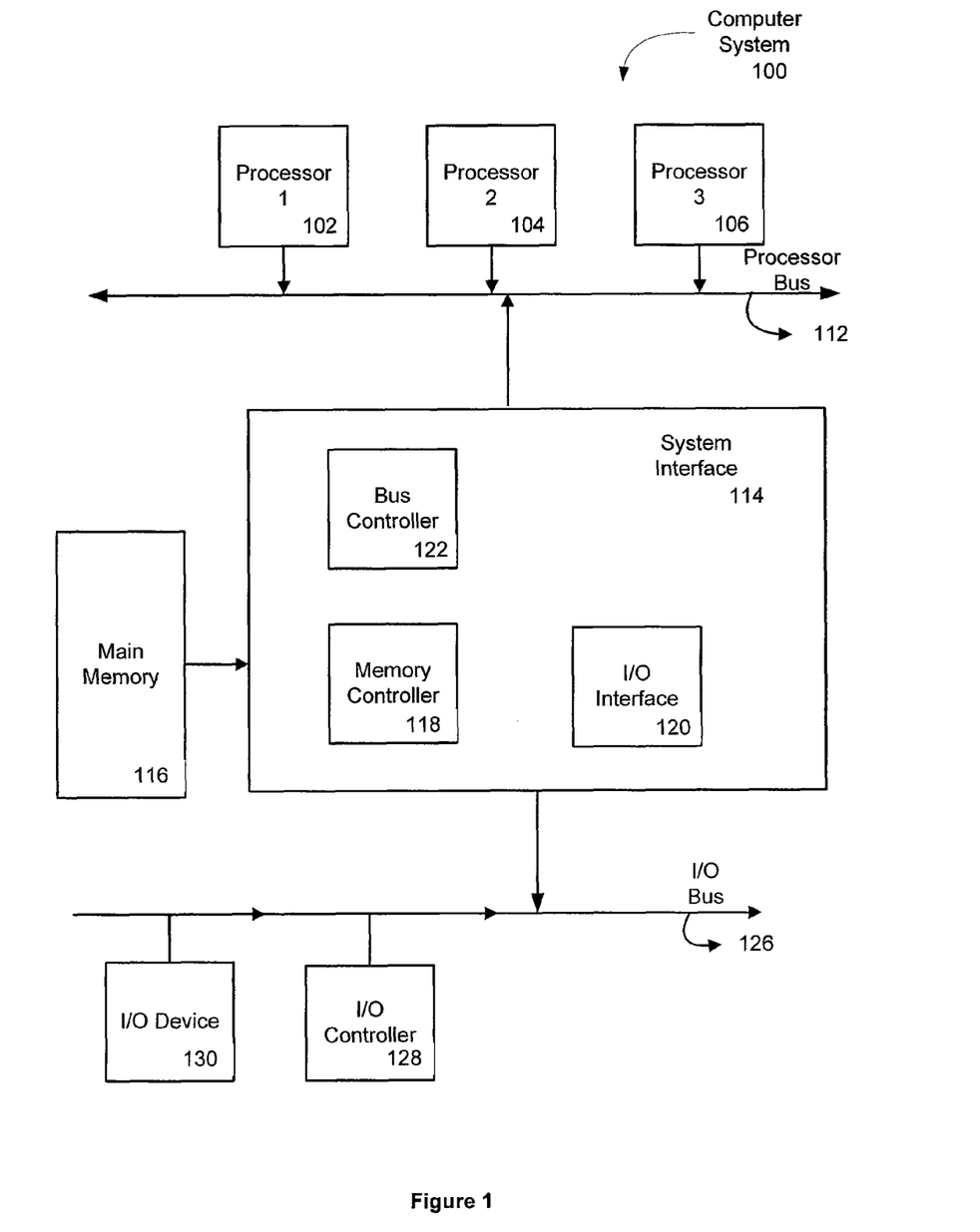
FIG. 1 is a block diagram illustrating a computer system.

FIG. 1 is a block diagram illustrating an exemplary computer system 100 which may be used in implementing embodiments of the present invention. The computer system (system) includes one or more processors 102-106. Processors 102-106 may include one or more internal levels of cache (not shown) and a bus controller or bus interface unit to direct interaction with the processor bus 112. Processor bus 112, also known as the host bus or the front side bus, may be used to couple the processors 102-106 with the system interface 114. System interface 114 may be connected to the processor bus 112 to interface other components of the system 100 with the processor bus 112. For example, system interface 114 may include a memory controller 118 for interfacing a main memory 116 with the processor bus 112. The main memory 116 typically includes one or more memory cards and a control circuit (not shown). System interface 114 may also include an input/output (I/O) interface 120 to interface one or more I/O bridges or I/O devices with the processor bus 112. One or more I/O controllers and/or I/O devices may be connected with the I/O bus 126, such as I/O controller 128 and I/O device 130, as illustrated.

I/O device 130 may include a display device (not shown), such as a cathode ray tube (CRT) or liquid crystal display (LCD), for displaying information to an end user. I/O device 130 may also include an input device (not shown), such as an alphanumeric input device, including alphanumeric and other keys for communicating information and/or command selections to the processors 102-106. Another type of user input device includes cursor control, such as a mouse, a trackball, or cursor direction keys for communicating direction information and command selections to the processors 102-106 and for controlling cursor movement on the display device.

System 100 may include a dynamic storage device, referred to as main memory 116, or a random access memory (RAM) or other devices coupled to the processor bus 112 for storing information and instructions to be executed by the processors 102-106. Main memory 116 also may be used for storing temporary variables or other intermediate information during execution of instructions by the processors 102-106. System 100 may include a read only memory (ROM) and/or other static storage device coupled to the processor bus 112 for storing static information and instructions for the processors 102-106. The system set forth in FIG. 1 is but one possible example of a computer system that may employ or be configured in accordance with aspects of the invention. Many other possible computer systems may also employ aspects of the invention, and the invention should not be limited to this particular system.

Figure 2:
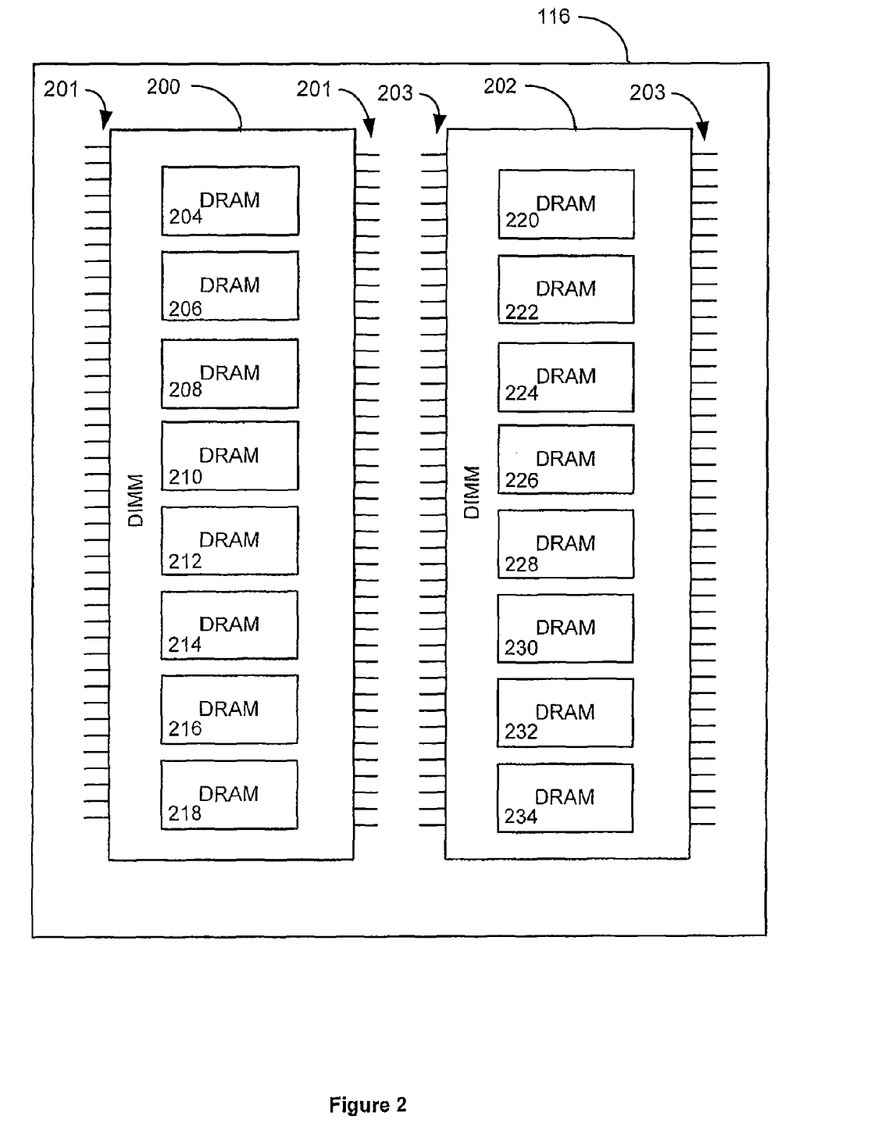
FIG. 2 is a block diagram illustrating a common structure of random access memory of a computer system.

FIG. 2 illustrates one example of a dynamic random access memory of main memory 116. The dynamic random access memory may include two DIMMs (200, 202). The DIMMs (200, 202) each contain eight DRAM integrated memory modules 204-234. In one particular embodiment, each DRAM memory module 204-234 may be a random access memory module that stores each bit of information in a capacitor within an integrated circuit. Referring to FIG. 2, DIMM 200 contains DRAM memory modules 204-218 and DIMM 202 contains DRAM memory modules 220-234. While this particular embodiment illustrates eight DRAM memory modules for each DIMM, those skilled in the art will recognize that DIMMs containing more or less DRAM chips are commonly available. Further, those skilled in the art will recognize that main memory 116 may include any number of DIMMs.

Referring to FIG. 1 and FIG. 2, memory controller 118 may access the data stored in DRAM memory modules 204-218 of main memory 116 through the pins 201 of DIMM 200. Similarly, memory controller 118 may access the data stored in DRAM memory modules 220-234 through the pins 203 of DIMM 202. Thus, the DIMMs (200, 202) may provide the mechanism by which DRAM memory modules 220-234 interface with computer system 100. Processors 102-106 may then use memory controller 118 to store information and instructions to be executed by the processors 102-106 in DRAM memory modules 204-234.

As the data stored in DRAM memory modules 204-234 is retrieved by memory controller 118, a computer system 100 will generally perform error detection and correction. Those skilled in the art will appreciate that several techniques exist for performing error detection on data retrieved from memory. One possible technique is through the use of a parity bit. A parity bit is a bit that attaches to the end of a string of data that indicates whether the number of bits with a value of one in the string of data is odd or even. One or more parity bits are often attached to the string of data when the data is written to memory. When the stored data is retrieved from memory, the parity bit is also retrieved. The combination of the data retrieved from memory and the accompanying parity bits are known as a checkword.

A detailed description of one method for retrieving the checkword from memory is described in detail below with reference to FIG. 3. After the checkword is retrieved from memory, the memory controller 118 then computes whether the number of bits with a value of one in the retrieved string of data is odd or even and compares that against the parity bit. If the calculated value and the parity bit are not the same, then an error has occurred. Through the use of a plurality of parity bits and error correcting code (ECC), a computer system 100 can achieve single error correction and double error detection (SECDED) for data retrieved from memory. For example, the utilization of nine ECC bits will provide SECDED protection for a 128 bit data sequence of data, creating a checkword 137 bits in length. This type of error detection and correction is well known to those skilled in the art and will not be described further. A computer system 100 employing SECDED protection can both detect and correct single bit errors in a checkword. However, SECDED schemes will only provide detection, but not correction, of two simultaneous errors in a checkword. Thus, two simultaneous errors in a single checkword is known as an uncorrectable error. Uncorrectable errors indicate that corruption of user or system data is occurring, and generally requires the shutdown and restart of the processing program in order to prevent the propagation of corrupted data to permanent storage.

Figure 3:
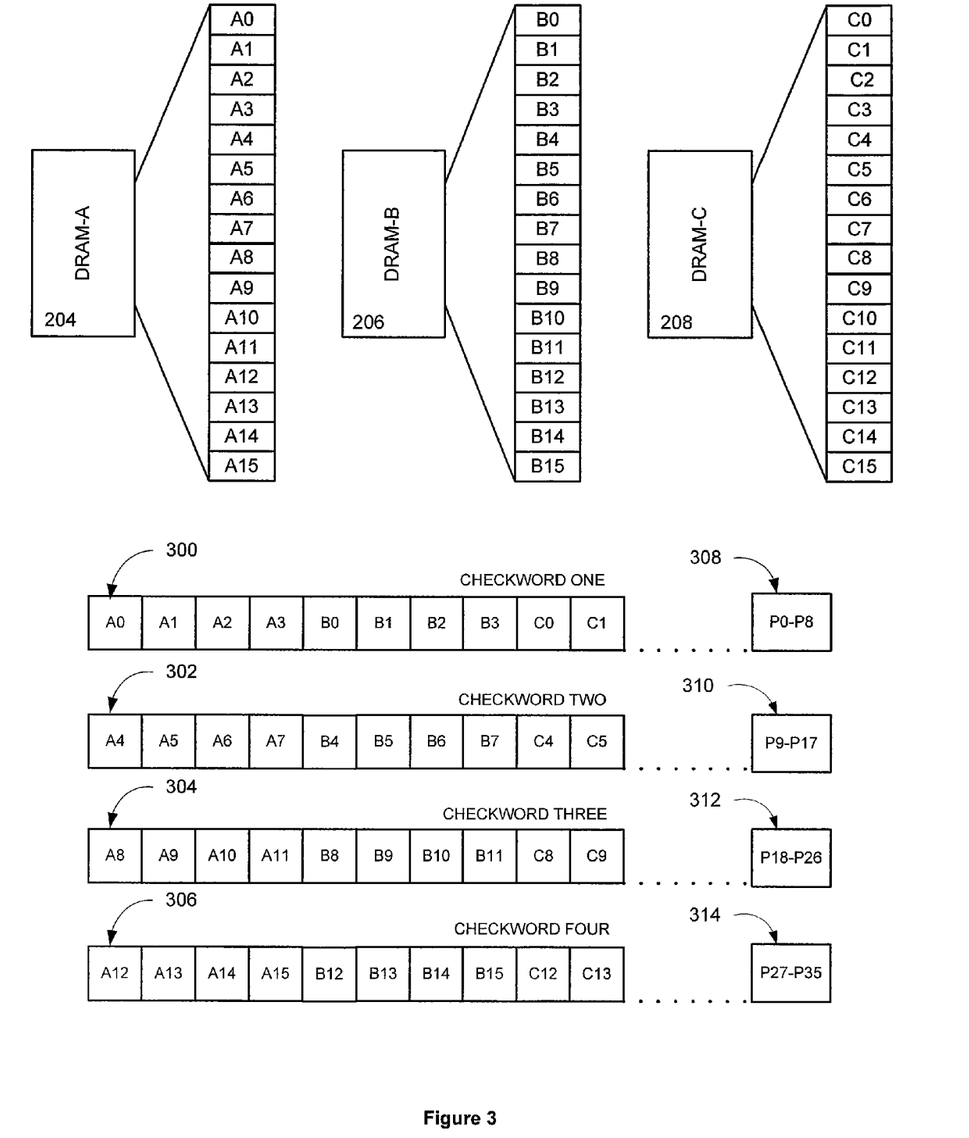
FIG. 3 is a block diagram illustrating a method for accessing and performing error detection on data stored in the memory of a computer system.

FIG. 3 is a block diagram illustrating one method for accessing and performing error detection on data stored in DRAM memory modules 204-234. For purposes of example, only DRAM memory modules 204-208 are illustrated. For purposes of this example, each DRAM memory module 204-

208 has 16 output pins (not shown) from which the data is read. Thus, each DRAM memory module 204-208 provides 16 bits of data for each address location within memory, with DRAM memory module 204 providing data bits A0-A15, DRAM memory module 206 providing data bits B0-B15, and DRAM memory module 208 providing data bits C0-C15. Referring to FIG. 3, each DRAM memory module 204-234 on the DIMMs (200, 202) may provide, in the manner described, 16 bits of data for each address location within memory, creating a data string 512 bits long at each address.

As stated above, a checkword is composed of the data retrieved from memory along with the accompanying ECC bits. As those skilled in the art will appreciate, the method by which error detection is performed on data read from memory is determined by the hardware architecture of the main memory 116. Thus, the memory controller 118 accesses the data stored in the DRAM memory modules 204-234 and populates checkwords for the purpose of error detection in a manner consistent with the memory architecture. For purposes of this example, each DRAM memory module 204-208 provides four bits of data to each of four checkwords 300-306. Thus, DRAM memory module 302 provides bits A0-A3 to checkword one (300), A4-A7 to checkword two (302), A8-A11 to checkword three (304), and A12-A15 to checkword four (306). Similarly, DRAM memory module 304 provides bits B0-B3 to checkword one (300), B4-B7 to checkword two (302), B8-B11 to checkword three (304), and B12-B15 to checkword four (306). This process continues for each DRAM memory module 204-234 located on the DIMMs (200, 202) until checkwords 300-306 are full and all 512 data bits from that particular address location have been supplied by the DRAM memory modules 204-234. Thus, the 32 DRAM memory modules located on the DIMMs (200, 202) may each provide four bits of data to each checkword 300-306, creating four checkwords 128 bits of data in length plus the accompanying parity bits. Those skilled in the art will recognize that a variety of methods exist for populating a checkword from memory.

Also retrieved from each DRAM memory module 204-208 are ECC bits 308-314. As described above, the ECC bits are used by the memory controller 118 to detect and correct single bit errors in the retrieved data. The number of ECC bits attached to each checkword 300-306 depends on the number of bits of data contained in the checkword. For purposes of this example, a checkword with 128 bits of data may contain nine ECC bits attached to the end of the data string. Thus, checkword one (300) may include an ECC string 308 containing bits P0-P8, checkword two (302) may include an ECC string 310 containing bits P9-P17, checkword three (304) may include an ECC string 312 containing bits P18-P26, and checkword four (306) may include an ECC string 314 containing bits P27-P35. After checkwords 300-306 are populated with the data and ECC bits retrieved from the DRAM memory modules 204-208, the memory controller 118 may then compute whether the number of bits with a value of one in the retrieved string of data is odd or even and compares that against the ECC bits 308-314. If a single error is detected in the checkword, the error may be corrected by the computer system 100 through the use of the error correcting code. Conventionally, the detection of two errors within a checkword may cause an uncorrectable error and the stoppage and restart of the program is required.

To accurately predict, and thereby prevent, the occurrence of an uncorrectable error, aspects of the present invention looks for specific patterns of correctable errors, expressed in terms of the relative addresses and bit positions of the detected errors from memory within a specified period of time, which indicate an increased likelihood of an uncorrectable error occurring. The accurate prediction of an uncorrectable error provides the user an opportunity to replace the faulty memory system before the uncorrectable error occurs and user data is corrupted.

Figure 4:
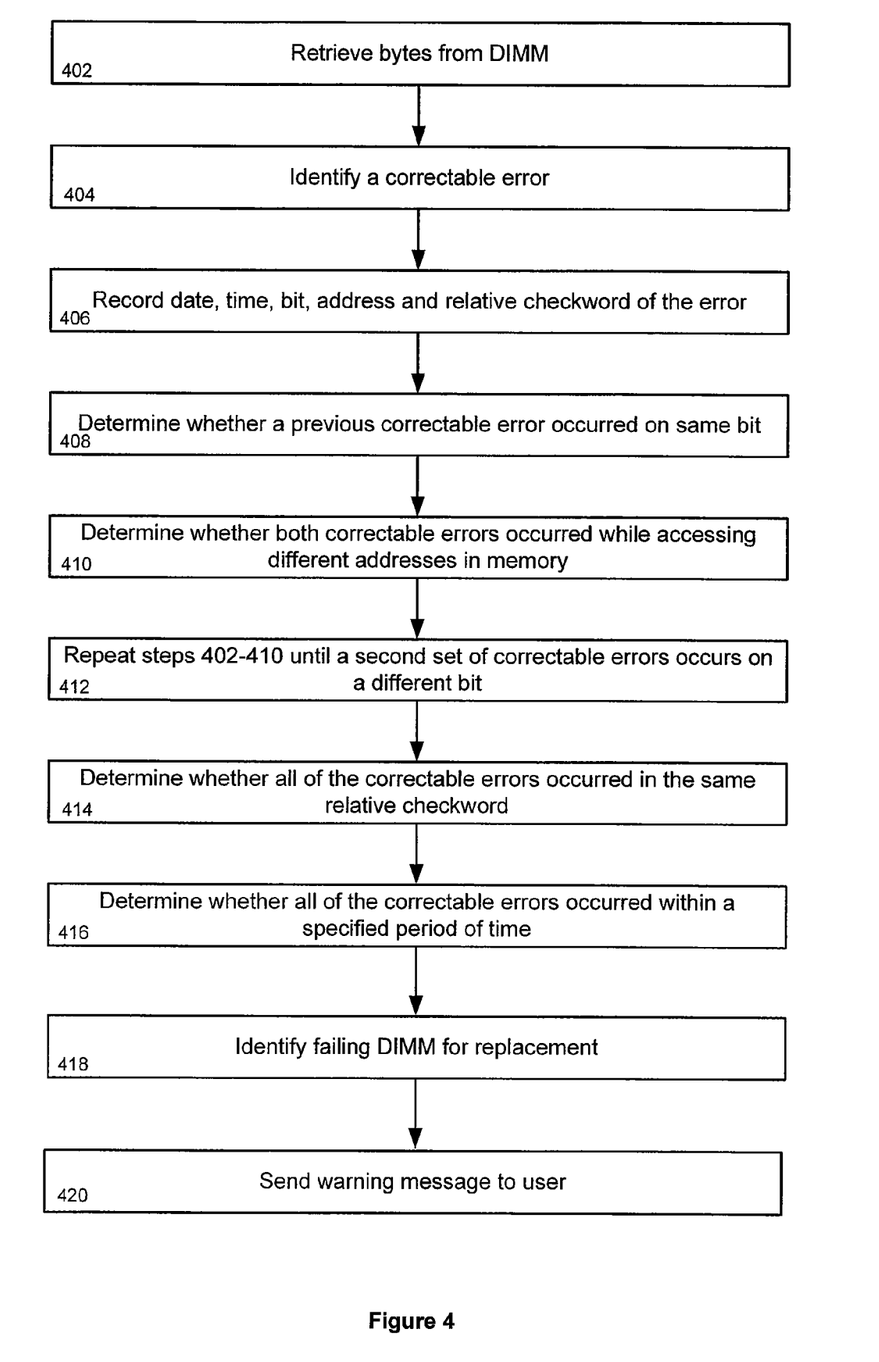
FIG. 4 is a flow chart illustrating one particular method to predict uncorrectable errors in the memory of a DIMM in accordance with aspects of the present invention.

FIG. 4 is a flow chart illustrating one particular method to predict uncorrectable errors in the memory of a DIMM in accordance with aspects of the present invention. This method is discussed with reference to FIGS. 1-3, but it is applicable to other possible memory configurations. Beginning in operation 402, memory controller 118 accesses the data and ECC bits stored in DRAM memory modules 204-234 through DIMMs (200, 202). This data is used to populate checkwords 300-306 as discussed with respect to FIG. 3. In operation 404, memory controller 118 may compare the data bits against the ECC bits of checkwords 300-306 to determine if an error in the data has occurred. If a correctable error is found, information about the error may be recorded and stored at operation 406. In one particular embodiment, the DRAM bit position of the error, the address being accessed when the error occurs, the relative checkword the error occurs in, and the date and time of the error may be recorded. For purposes of example, referring again to FIG. 3, assume a correctable error is detected on bit position A0 while memory controller 118 is accessing memory location 1000. In this case, bit position A0, the date and time the error occurred, the fact that the error occurred in checkword one (300), and the address location 1000 are all be recorded in operation 406. This information may be used to compare the correctable error with previous or future correctable errors in search of a pattern of correctable errors to predict whether an uncorrectable error is likely.

After the circumstances of the correctable error are recorded, the system determines whether previous errors have occurred at the same bit position (operation 408). If a previous error has occurred at the same bit position, operation 410 may compare the recorded errors to verify that both occurred while accessing different addresses in memory. Continuing the above example, assume that at some time after the first correctable is found on bit position A0, a second correctable error also occurs on bit position A0, however this error occurs while accessing address location 1100. Operation 408 may then compare the error to the previously recorded error and determine that it is the second error that has occurred at the same bit position. Operation 410 may then compare the two errors at bit position A0 to determine whether the errors occurred while accessing different addresses in memory. In this example, a correctable error has occurred on bit position A0 twice, once while accessing memory address location 1000 and again while accessing memory address location 1100.

As mentioned above, operation 410 may determine whether both correctable errors at the same bit position occurred while accessing different addresses in memory. Errors at the same bit position that occur while accessing the same address in memory indicate a faulty cell within DRAM memory module rather than a faulty DIMM. Errors caused by a faulty memory cell can be avoided by utilizing a memory page retirement of the faulty cell and the surrounding region within the DRAM memory module. Alternatively, correctable errors occurring at the same bit position while accessing different addresses indicates that more than one cell within the DRAM memory module may be failing or the entire DIMM itself may have a structural failure. Verifying that the correctable errors occurred at the same bit position while accessing different memory addresses creates a stronger likelihood that two errors may occur simultaneously in a checkword resulting in an uncorrectable error.

In one particular embodiment, after two or more correctable errors at a first bit position from different addresses has been recorded, operations 402-410 may be repeated at operation 412 until a second set of correctable errors has occurred at a second bit position from different addresses. Expanding on the previous example, assume that some time after the two errors at bit position A0 while accessing different addresses in memory have occurred, a second pair of correctable errors also occurs at bit position B3 while accessing different addresses in memory. At this point, at least four correctable errors have been detected, two in bit position A0 while accessing different addresses and two in bit position B3 while accessing different addresses. While this example demonstrates two or more correctable errors occurring at bit position A0 before the two or more correctable errors occur at bit position B3, it should be appreciated that the correctable errors may occur in any order.

In operation 414, one particular embodiment determines whether the correctable errors have occurred in the same relative checkword. As explained above, a computer system utilizing SECDED protection can correct a single, or correctable, error in a checkword. However, two simultaneous errors within a single checkword cannot be corrected, resulting in an uncorrectable error. Therefore, the frequent occurrence of correctable errors within a single checkword creates a stronger likelihood of an uncorrectable error than frequent correctable errors in separate checkwords. Again using the present example, the errors occurring at bit position A0 and bit position B3 both occur within the same checkword 300.

In operation 416, the detected correctable errors may then be analyzed to verify that they occurred within a specified period of time. The specified period of time can be set at any length of time to conform with system specified data. For example, computer systems 100 utilizing an ULTRASPARC T2 processor manufactured by Sun Microsystems, Inc of Palo Alto, Calif. may set the period of time at 72 hours. Thus, continuing the present example, if all four correctable errors occur within 72 hours, an uncorrectable error on checkword 300 is likely in the near future.

In operation 418, if all of the previous operations are met, then an uncorrectable error is likely in the near future from the related DIMM. To prevent the uncorrectable error from occurring, the DIMM may be replaced before the error occurs and user data is corrupted. To facilitate the replacement, a warning message may be sent to the user in operation 420 indicating that an uncorrectable error is imminent and that the user should schedule maintenance to replace the failing DIMM. This allows the user to schedule down time in the system and replacement of the failing device before an uncorrectable error occurs. This further allows the user to cease using the corrupted system until the replacement of the corrupted memory device can take place. A warning message may also be generated and sent to an administrator or manufacturer of the computer system 100. This allows the administrator or manufacturer to collect data on the number of faulty memory systems for quality control purposes. This also allows the administrator or manufacturer an opportunity to contact the user to schedule maintenance of the failing memory system.

Figure 5:
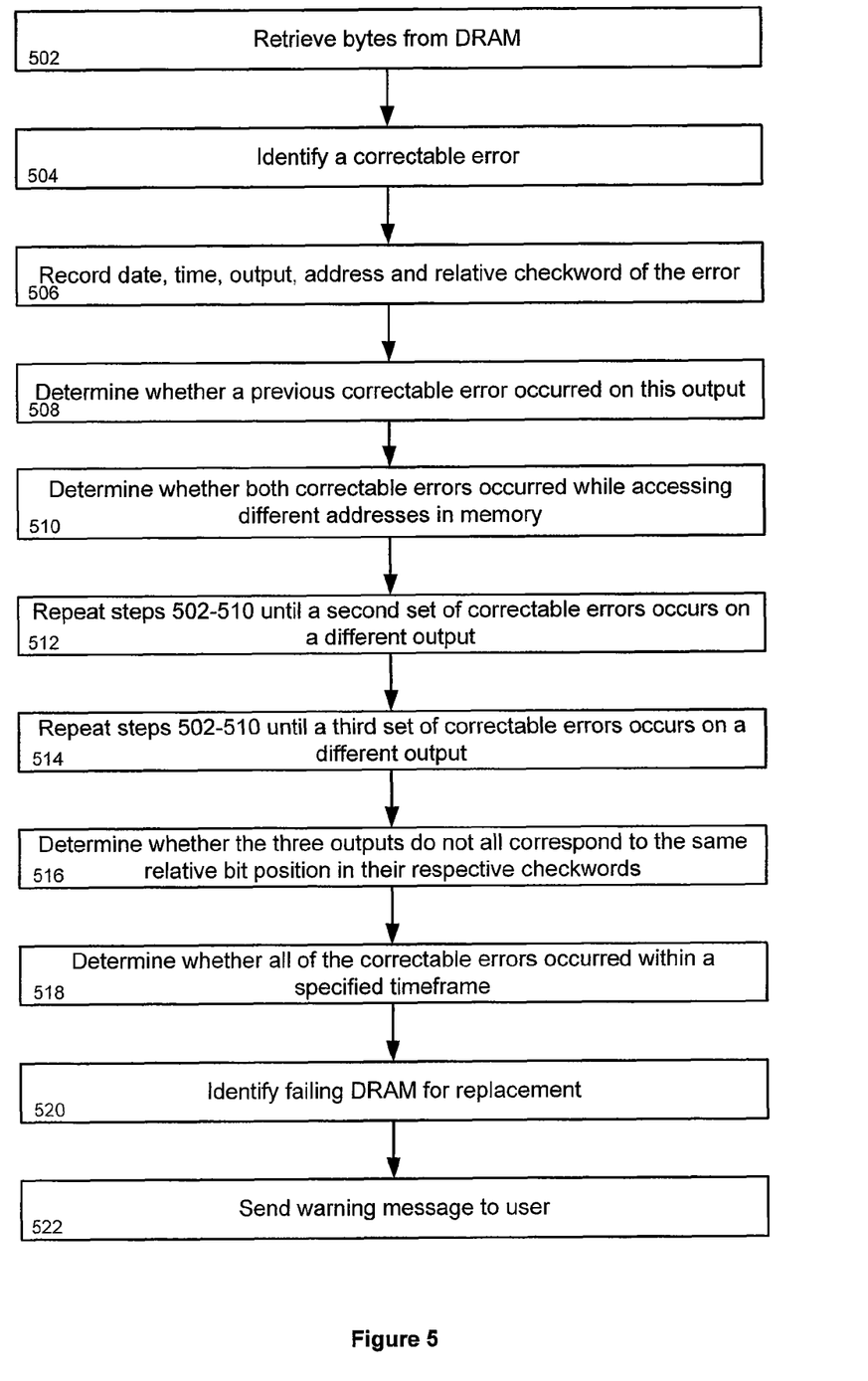
FIG. 5 is a flow chart illustrating one particular method to predict uncorrectable errors in the memory of a DRAM chip in accordance with aspects of the present invention.

FIG. 5 is a flow chart illustrating a second particular method to predict uncorrectable errors in the memory of a DRAM in accordance with aspects of the present invention. This method is discussed with reference to FIGS. 1-3, but it is applicable to other possible memory configurations. Beginning in operation 502, memory controller 118 accesses the data and ECC bits stored in DRAM memory modules 204-234 through DIMMs (200, 202). This data is used to populate checkwords 300-306 as discussed with respect to FIG. 3. In operation 504, memory controller 118 may compare the data bits against the ECC bits of checkwords 300-306 to determine if an error in the data has occurred. If a correctable error is found, information about the error may be recorded at operation 506. In one particular embodiment, the output of the DRAM on which the error occurs, the address being accessed when the error occurs, the relative checkword the error occurs in, and the date and time of the error may be recorded. For purposes of example, referring again to FIG. 3, assume a correctable error is detected on the first output of DRAM memory module 204 (i.e. bit A0) while memory controller 118 is accessing address location 2000. In this case, the first output position of DRAM memory module 204, the date and time the error occurred, the fact that the error occurred in checkword one 300, and the address location 2000 are all recorded in operation 506. This information may be used to compare the correctable error with previous or future error in search of a pattern of correctable errors to predict whether an uncorrectable error is likely.

After the circumstances of the correctable error are recorded, the system determines whether previous errors have occurred on the same output (operation 508). If a previous error has occurred on the same output, operation 510 may compare the errors to verify that both occurred while accessing different addresses in memory. Continuing the above example, assume that at some time after the first correctable is found on the first output of DRAM memory module 204, a second correctable error also occurs on the first output, however this error occurs while accessing address location 2100. Operation 508 may then compare the error to the previously recorded error and determine that this is the second error that has occurred on this output. Operation 510 may then compare the two errors on the first output to determine whether the errors occurred while accessing different addresses in memory. In this example, a correctable error has occurred on the first output of DRAM memory module 204 twice, once while accessing memory address location 2000 and again while accessing memory address location 2100.

In one particular embodiment, after two or more correctable errors at a first output from different addresses has been recorded, operations 502-510 may be repeated at operation 512 until a second set of correctable errors has occurred on a second output of the same DRAM memory module from different addresses. Expanding on the previous example, assume that some time after the two errors on the first output (bit A0) of DRAM memory module 204 have occurred, a second pair of correctable errors occurs on the sixth output of DRAM memory module 204 (i.e. bit A5) while accessing different addresses in memory. At this point, at least four correctable errors have been detected, two on the first output of DRAM memory module 204 while accessing different addresses and two on the sixth output of DRAM memory module 204 while accessing different addresses.

At operation 514, operations 502-510 may again be repeated again until a third set of correctable errors has occurred on a third output of the same DRAM memory module from different addresses. Expanding on the previous example, assume that some time after the two sets of errors have occurred on the first (A0) and sixth (A5) output of DRAM memory module 204 while accessing different addresses in memory, a third pair of correctable errors occurs on the eleventh output of DRAM memory module 204 (i.e. bit A10) while accessing different addresses in memory. At this point, at least six correctable errors have been detected, two on the first output of DRAM memory module 204 while accessing different addresses, two on the sixth output while accessing different addresses and two on the eleventh output while accessing different addresses. While this example demonstrates two or more correctable errors occurring on the first output before two or more correctable errors occur on the second or third output, it should be appreciated that the two or more correctable errors occurring on the outputs may occur in any order.

In operation 516, this particular embodiment may determine whether the at least six correctable errors do not all correspond to the same relative bit position in their respective checkwords 300-306. Returning to the example, at this point errors have been detected on the first output, the sixth output, and the eleventh output of DRAM memory module 304. Further, because the first output (A0) corresponds to the first bit of checkword one (300), the sixth output (A5) corresponds to the second bit of checkword two (302), and the eleventh bit (A10) corresponds to the third bit of checkword three (306), all three output do not correspond to the same relative bit position in their respective checkwords 300-306. Thus, operation 516 is satisfied.

At operation 518, the detected correctable errors may be analyzed to verify that they occurred within a specified period of time. The specified period of time can be set at any length of time to conform with system specified data. In one particular embodiment, the period of time is set at 72 hours. Thus, if all six correctable errors occur within 72 hours, the related DRAM memory module is failing and an uncorrectable error is likely in the near future.

At operation 520, if all of the previous steps are met, then an uncorrectable error is likely in the near future from the related DRAM. To prevent the uncorrectable error from occurring, the DRAM may be replaced before the error occurs and user data is corrupted. To facilitate the replacement, a warning message may be sent to the user indicating that an uncorrectable error is imminent and that the user should schedule maintenance to replace the failing DRAM or DIMM (operation 522). This allows the user to schedule down time in the system and replacement of the failing device before an uncorrectable error occurs. This further allows the user to cease using the corrupted system until the replacement of the corrupted memory device can take place. A warning message may also be generated and sent to an administrator or manufacturer of the computer system 100. This allows the administrator or manufacturer to collect data on the number of faulty memory systems for quality control purposes. This also allows the administrator or manufacturer an opportunity to contact the user to schedule maintenance of the failing memory system.

It should be noted that, while the embodiments described herein may be performed under the control of a programmed processor, such as processors 102-106, in alternative embodiments, the embodiments may be fully or partially implemented by any programmable or hard coded logic, such as field programmable gate arrays (FPGAs), transistor logic (TTL), or application specific integrated circuits (ASICs). Additionally, the embodiments of the present invention may be performed by any combination of programmed general purpose computer components and/or custom hardware components. Therefore, nothing disclosed herein should be construed as limiting the various embodiments of the present invention to a particular embodiment wherein the recited embodiments may be performed by a specific combination of hardware components.

While the disclosed embodiments are described in specific terms, other embodiments encompassing principles of the invention are also possible. Further, operations may be set forth in a particular order. The order, however, is but one example of the way that operations may be provided. Operations may be rearranged, modified, or eliminated in any particular implementation while still conforming to aspects of the invention. Embodiments within the scope of the present invention also include computer readable media for carrying or having computer executable instructions or data structures stored thereon. Such computer readable media may be any available media that can be accessed by a general purpose or special purpose computer (e.g. computer system 100). By way of example, and not limitation, such computer readable media can comprise RAM, ROM, PROM, EPROM, EEPROM, DVD, CD ROM or other optical disk storage, magnetic disk storage or other magnetic storage devices, or any other medium which can be used to carry or store desired program code means in the form of computer executable instructions or data structures and which can be accessed by a general purpose or special purpose computer. When information is transferred or provided over a network or another communications link or connection (either hardwired, wireless, or a combination of hardwired or wireless) to a computer, the computer properly views the connection as a computer readable medium. Thus, any such connection is properly termed a computer readable medium. Combinations of the above should also be included within the scope of computer readable media. Computer executable instructions comprise, for example, instructions and data which cause a general purpose computer, special purpose computer, or special purpose processing device to perform a certain function or group of functions.

In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for predicting uncorrectable errors in a memory system comprising:
   detecting a plurality of correctable errors from a memory device;
   analyzing the plurality of correctable errors to identify a pattern of the plurality of correctable errors, the pattern indicative of a future occurrence of an uncorrectable error from the memory device wherein the analyzing operation comprises:
      identifying a plurality of first correctable errors from a first bit position of a memory device, the plurality of first correctable errors generated while accessing a first address and a second address in the memory device, wherein the first address and the second addresses are distinct;
      identifying a plurality of second correctable errors from a second bit position of the memory device, the plurality of second correctable errors generated while accessing a third address and a fourth address in the memory device, wherein the third address and the fourth addresses are distinct;
      identifying a first checkword position associated with the first bit position;
      identifying a second checkword position associated with the second bit position; and
      identifying whether the first checkword position and the second checkword position occur in a same checkword construct comprising a plurality of checkword positions populated by a plurality of bit positions of the memory device; and
      determining that the plurality of first correctable errors occurs at the first bit position and the plurality of second correctable errors occurs at the second bit position; and
   providing an indicator of the future occurrence of the uncorrectable error from the memory device.

2. The method of claim 1, wherein the analyzing operation identifies a plurality of locations in the memory device of the plurality of correctable errors and determines whether the plurality of correctable errors are indicative of future correctable errors at the plurality of locations in the memory device.

3. The method of claim 1, wherein the analyzing operation further comprises:
identifying whether the plurality of first correctable errors and the plurality of second correctable errors occur within a specified period of time.

4. The method of claim 3 wherein the specified period of time is 72 hours.

5. A method for predicting uncorrectable errors in a memory system comprising:
detecting a plurality of correctable errors from a memory device;
analyzing the plurality of correctable errors to identify a pattern of the plurality of correctable errors, the pattern indicative of a future occurrence of an uncorrectable error from the memory device wherein the analyzing operation comprises:
identifying a plurality of first correctable errors from a first output pin of the memory device, the plurality of first correctable errors generated while accessing a first address and a second address in the memory device, wherein the first address and the second address are distinct;
identifying a plurality of second correctable errors from a second output pin of the memory device, the plurality of second correctable errors generated while accessing a third address and a fourth address in the memory device, wherein the third address and the fourth address are distinct; and
identifying a plurality of third correctable errors from a third output pin of the memory device, the plurality of third correctable errors generated while accessing a fifth address and a sixth address in the memory device, wherein the fifth address and the sixth address are distinct;
identifying a first checkword associated with the first output pin, the first output pin corresponding to a bit position in the first checkword;
identifying a second checkword associated with the second output pin, the second output pin corresponding to a bit position in the second checkword;
identifying a third checkword associated with the third output pin, the third output pin corresponding to a bit position in the third checkword;
identifying whether the corresponding bit positions of the first output pin, the second output pin, and the third output pin in the first checkword, the second checkword and the third checkword, respectively, are the same; and
providing an indicator of the future occurrence of the uncorrectable error from the memory device.

6. The method of claim 5, wherein the analyzing operation further comprises:
identifying whether the first correctable errors, the second correctable errors, and the third correctable errors occur within a specified period of time.

7. The method of claim 6 wherein the specified period of time is 72 hours.

8. The method of claim 1, wherein the providing operation further comprises:
generating a message to a user warning of the future occurrence of the uncorrectable error.

9. The method of claim 8, wherein the message instructs the user to replace the memory device.

10. The method of claim 1 wherein the memory device is a DIMM.

11. The method of claim 1 wherein the memory device is a DRAM.

12. A computing system for predicting uncorrectable errors in memory comprising:
a memory controller in communication with at least one memory device, the memory controller configured to perform error detection of data stored in the at least one memory device; and
a processor in communication with the memory controller and the at least one memory device, the processor configured to:
detect a plurality of first correctable errors from a first bit position of a memory device, the plurality of first correctable errors detected while accessing a first address and a second address in the memory device, wherein the first address and the second address are distinct;
detect a plurality of second correctable errors from a second bit position of the memory device, the plurality of second correctable errors detected while accessing a third address and a fourth address in the memory device, wherein the third address and the fourth address are distinct;
determine that the plurality of first correctable errors occurs at the first bit position and the plurality of second correctable errors occurs at the second bit position;
identify a first checkword position associated with the first bit position;
identify a second checkword position associated with the second bit position;
determine that the first checkword position and the second checkword position are in a same checkword construct comprising a plurality of checkword positions populated by a plurality of bit positions of the memory device; and
identify the memory device as having a high probability of an uncorrectable error.

13. The system of claim 12, wherein the processor is further configured to:
determine that the first correctable errors and the second correctable errors occur within a specified period of time.

14. The system of claim 13 wherein the specified period of time is 72 hours.

15. The system of claim 12, wherein the processor is further configured to:
generate a message to a user warning of a future occurrence of an uncorrectable error.

16. The system of claim 15, wherein the message instructs the user to replace the memory device.

17. The system of claim 12 wherein the memory device is a DIMM.

* * * * *